Jan. 11, 1949.　　　　K. H. FOX　　　　2,458,507
DYNAMOTOR
Filed June 28, 1946
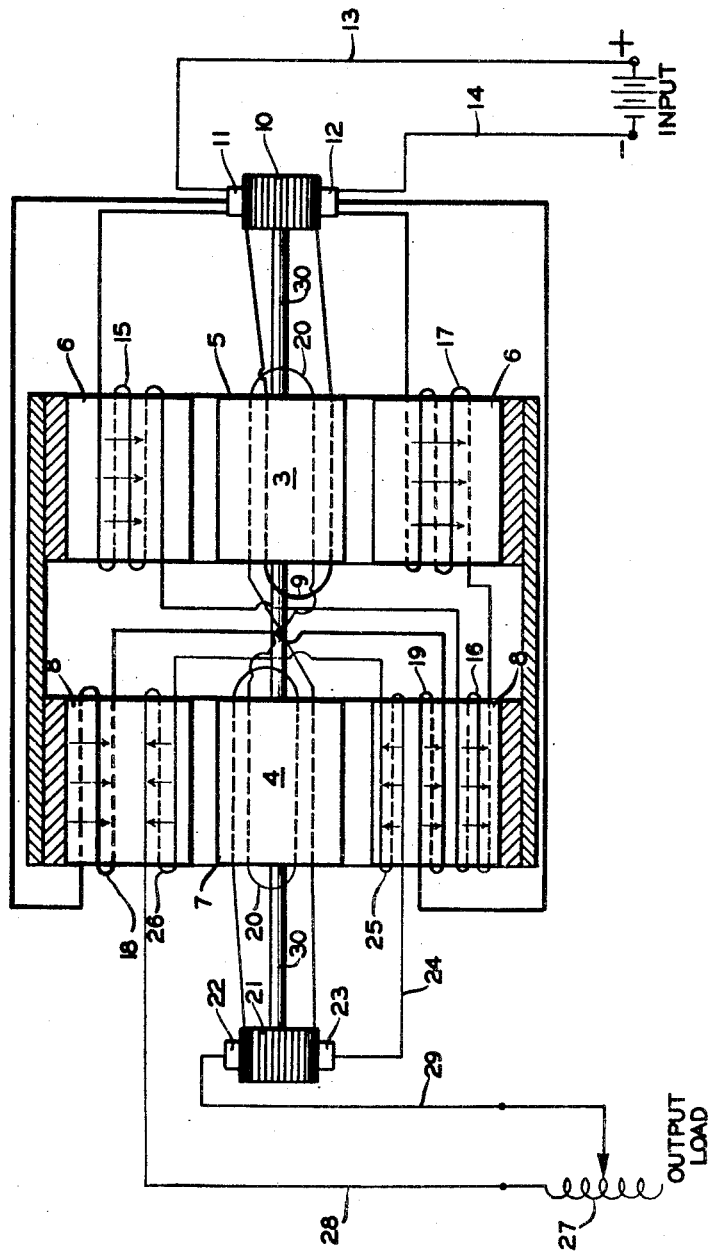
INVENTOR
KENNETH H. FOX
BY
ATTORNEY Patented Jan. 11, 1949

2,458,507

UNITED STATES PATENT OFFICE 2,458,507

DYNAMOTOR

Kenneth H. Fox, Red Bank, N. J., assignor to Bendix Aviation Corporation, Teterboro, N. J., a corporation of Delaware Application June 28, 1946, Serial No. 679,938

2 Claims. (Cl. 171—123)

The present invention relates to direct current commutator type dynamoelectric machines and particularly to a dynamotor having a self compensating system for inherently effecting a substantially constant output under varying operating conditions.

An object of the invention is to provide an improved dynamoelectric machine having novel compensating windings effective under varying load conditions for effecting a substantially constant output condition.

Another object of the invention is to provide an improved dynamoelectric machine having novel compensating windings effective under varying input conditions for providing a substantially constant output condition.

Another object of the invention is to provide a novel rotary regulator for a dynamoelectric machine.

Another object of the invention is to provide an improved dynamoelectric machine having inherent compensating means for effecting a substantially constant output voltage under varying load and input voltage conditions within operating limits.

These and other objects and features of the invention are pointed out in the following description in terms of the embodiment thereof which is shown in the accompanying drawings. It is to be understood, however, that the drawing is for the purpose of illustration only, and is not designed as a definition of the limits of the invention, reference being had to the appended claims for this purpose.

The drawing is a schematic view of a dynamotor illustrating the invention.

Referring to the drawing, there is provided a dynamotor having two magnetic circuits indicated by numerals 3 and 4. The magnetic circuit 3 has a rotor 5 and stator 6, while the magnetic circuit 4 includes rotor 7 and stator 8.

The rotor 5 has a motor winding 9 connected to suitable segments of a commutator 10 having cooperating brushes 11 and 12. Input lines 13 and 14 lead to the respective brushes 11 and 12, as shown. The input lines are connected to a suitable source of electrical energy.

The stator 6 has a field winding 15 connected at one end to brush 11 and connected in series therewith a compensating coil 16 wound on the stator 8 in the magnetic circuit 4. A second field coil 17 wound on stator 6 is connected in series with the coil 16 and leads to the brush 12. There are also connected in series across the brushes 11 and 12 the field windings 18 and 19 wound on the stator 8.

An output winding 20 is wound in both magnetic circuits 3 and 4 on rotors 5 and 7 with the windings 20 on rotor 7 a multiple of the turns on rotor 5. The output winding 20 is connected to suitable segments of a commutator 21 having cooperating brushes 22 and 23. An output line 24 leads from brush 23 to a compensating field winding 25 wound on stator 8 and having connected in series therewith a second compensating field winding 26 on stator 8.

The field windings 25 and 26, as shown in the drawing, are connected in series with a variable load indicated schematically by numeral 27 through a conductor 28. A second output line 29 leads from the brush 22 to the load 27.

The commutator 10, rotor 5, rotor 7 and commutator 21 are carried by a drive shaft 30 suitably mounted and are rotated by the rotor 5 which cooperates with the stator 6 as a motor for driving the shaft 30 and connected parts.

The winding on rotor 7 and the field windings 18 and 19 serve to compensate the voltage induced in that portion of winding 20 on rotor 5 for changes in input voltage, while the winding 16 serves to overcome the lag in the magnetic circuit 4 due to hysteresis upon change in input voltage and is rapidly responsive to change in input voltage.

The winding 20 on rotors 5 and 7 are arranged so that the voltage generated in the one rotor winding opposes that in the other with the voltage generated in the winding 20 of rotor 5 through dynamotor action dominating.

The windings 16 and 19 have a like polarity and are arranged so that an increase in current flow through windings 16, 18 and 19, as upon a rise in input voltage, effects an increase in the magnetic flux in the magnetic circuit 4.

The windings 25 and 26 are arranged with opposite polarity to that of the windings 19 and 18, respectively, so that upon an increase in load 27 effecting an increase in the current flow through windings 25 and 26, there results a decrease in the magnetic flux of the magnetic circuit 4 effected by the windings 16, 18 and 19. Similarly upon a decrease in load 27 a corresponding decrease in the current flow through windings 25 and 26 decreases the subtractive effect and thereby results in an increase in the magnetic flux of the circuit 4 under the magnetic force of windings 16, 18 and 19.

In the operation of the device, it will be seen that upon an increase in the variable load 27 tending to decrease the output voltage, the current flow through output conductors 28 and 29 will increase tending to increase the excitation of the compensating field windings 25 and 26 connected in series with the load 27 and thereby increase subtraction of magnetic flux from the magnetic circuit 4 when the load is increased so as to tend to maintain the output voltage substantially constant. Likewise upon a decrease in the variable load 27 the current flow through the compensating windings 25 and 26 will decrease and thereby decrease subtraction of magnetic flux from the magnetic circuit 4 when the load is decreased so as to maintain the output voltage substantially constant.

It will be seen that upon an increase in input voltage the tendency to increase the output voltage induced in output winding 20 in magnetic circuit 3 through dynamotor action will be in part counteracted by the increased counteracting voltage induced in the winding 20 in magnetic circuit 4. The winding 20 in magnetic circuit 4 is so arranged that the voltage induced therein tends to counterbalance the increase in voltage induced in the winding 20 in circuit 3 due to increase in input voltage across commutator 10.

Moreover, through operation of the compensating windings 25 and 26, the magnetic flux of magnetic circuit 4 and accordingly the subtraction of voltage from the normal output of generator winding 20 varies with load so that the resultant voltage remains substantially constant for changes in load and input voltage.

Moreover, the winding 16 is so arranged in relationship to field coils 18 and 19 as to have an additive effect thereon and to the dominant magnetic flux produced thereby and thereby tends to overcome lag in the magnetic circuit 4 due to hysteresis upon change in input voltage.

It will be seen then that by proper proportionment of the foregoing windings, there may be provided a dynamotor having compensating means for effecting a substantially constant output voltage under varying input voltage and load conditions.

It will be seen that in operation, the magnetic circuit 4 and the several parts and windings therein serve as a rotary regulator for the dynamoelectric machine 3 so as to provide a substantially constant output voltage under varying input voltage and load conditions.

For purposes of clarity, the circuits shown in the drawing have been illustrated as applied to one set of rotor windings in one position of the commutators 10 and 21. However, in practice, a plurality of such sets of D. C. rotor windings 9 and 20 may be provided, as is well known in the art.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. A dynamoelectric machine including a stationary member and a rotatable member, said rotatable member being divided into a pair of magnetically substantially separate sections, a generator winding in both sections of said rotatable member, a motor winding in one of said sections, a first commutator connected to said generator winding, a second commutator connected to the motor winding, a first field winding on said stationary member and cooperating with said one section of the rotatable member, a second field winding on said stationary member and cooperating with the second section of said rotatable member, a source of electrical energy for exciting said first and second field windings, input brushes cooperating with the second commutator for connecting said motor winding to said source of electrical energy, a first compensating winding connected in series with said first field winding and having a like polarity to that of said second field winding, said compensating winding rapidly responsive to change in voltage of said source of energy and positioned adjacent said second field winding so as to effect rapid change in the magnetic flux of the second field winding upon variations in the electrical energy supplied by said source, output brushes cooperating with said first commutator, a second compensating winding on said stationary member and cooperating with said second section of the rotatable member, an electrical load, said second compensating winding connected in series with said load across said output brushes for compensating said generator winding for variations in the load, the portion of said generator winding in said second section having an opposite polarity to that of the other portion of the generator winding in the one section, and said portions of the generator winding being serially connected so as to compensate for variations in the input to said first and second field windings from said source of electrical energy to maintain a substantially constant output from said generator winding under varying load and electrical input conditions.

2. A dynamoelectric machine including a stationary member and a rotatable member, said rotatable member being divided into a pair of magnetically substantially separate sections, a generator winding in both sections of said rotatable member, a motor winding in one of said sections, a first commutator connected to said generator winding, a second commutator connected to the motor winding, a first field winding on said stationary member and cooperating with said one section of the rotatable member, a second field winding on said stationary member and cooperating with the second section of said rotatable member, a source of electrical energy for exciting said first and second field windings, input brushes cooperating with the second commutator for connecting said motor winding to said source of electrical energy, output brushes cooperating with said first commutator, a compensating winding on said stationary member and cooperating with said second section of the rotatable member, said compensating winding connected in series with a load across said output brushes for compensating said generator winding for variations in the load, the portion of said generator winding in said second section being greater than the portion of the generator winding in the one section and having a polarity opposite to that of the portion of said generator winding in the one section and said portions of the generator winding being serially connected so as to compensate for variations in the input to said first and second windings from said source of electrical energy to maintain a substantially constant output from the generator winding under varying load and electrical input conditions.

KENNETH H. FOX.

REFERENCES CITED

The following references are of record in the file of this patent:

UNITED STATES PATENTS

| Number | Name | Date |
|---|---|---|
| 889,911 | Darlington | June 9, 1908 |
| 1,436,152 | Churchward | Nov. 21, 1922 |
| 1,468,159 | Holifield | Sept. 18, 1923 |
| 1,553,104 | Pollock | Sept. 8, 1925 |
| 1,739,562 | Somajni | Dec. 17, 1929 |